April 25, 1961  R. K. BERKY  2,981,343
IMPLEMENT MOUNTING DEVICE

Filed May 31, 1956  5 Sheets-Sheet 2

INVENTOR
Richard K. Berky
Joseph Allen Brown
ATTORNEY

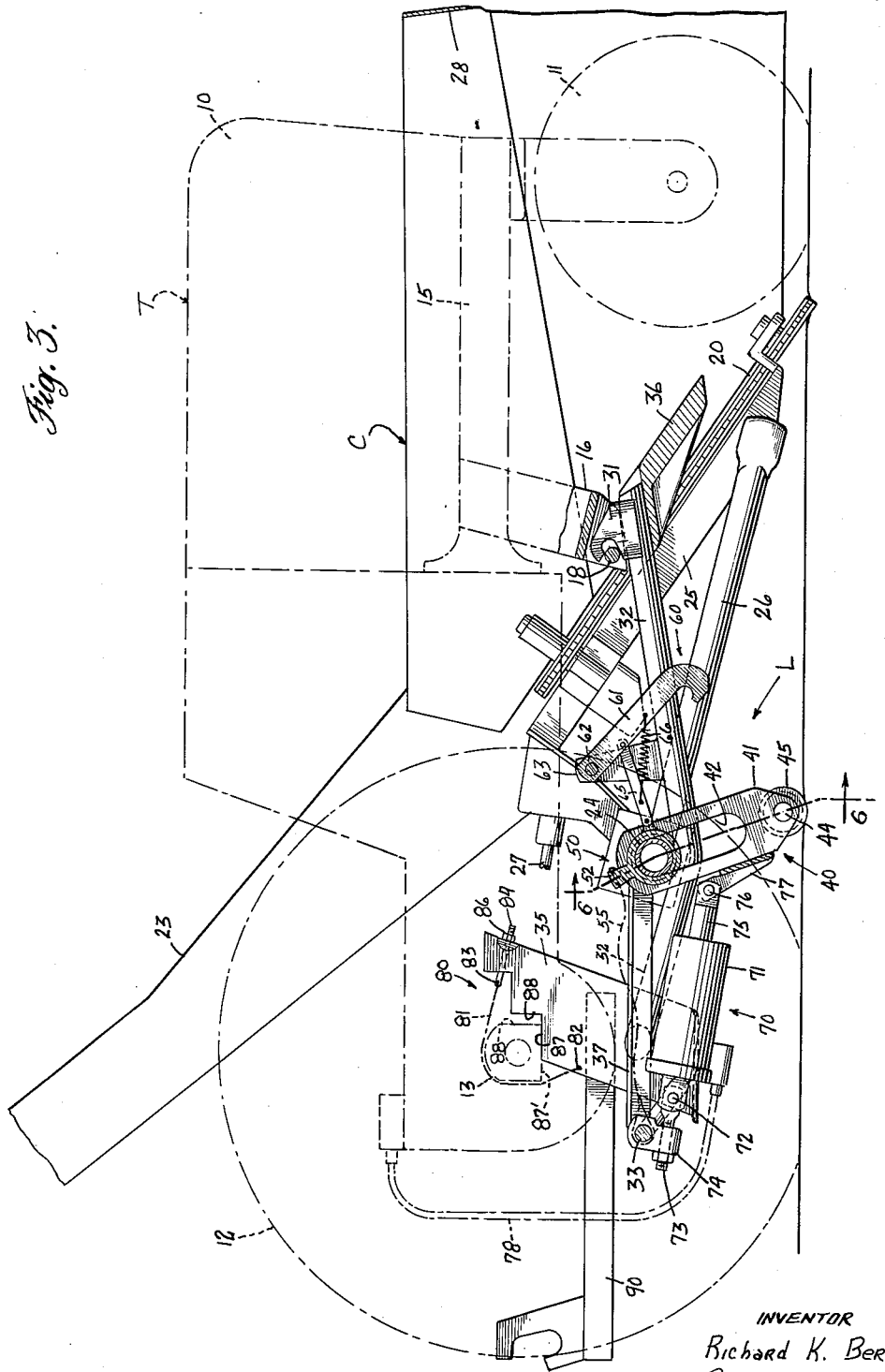

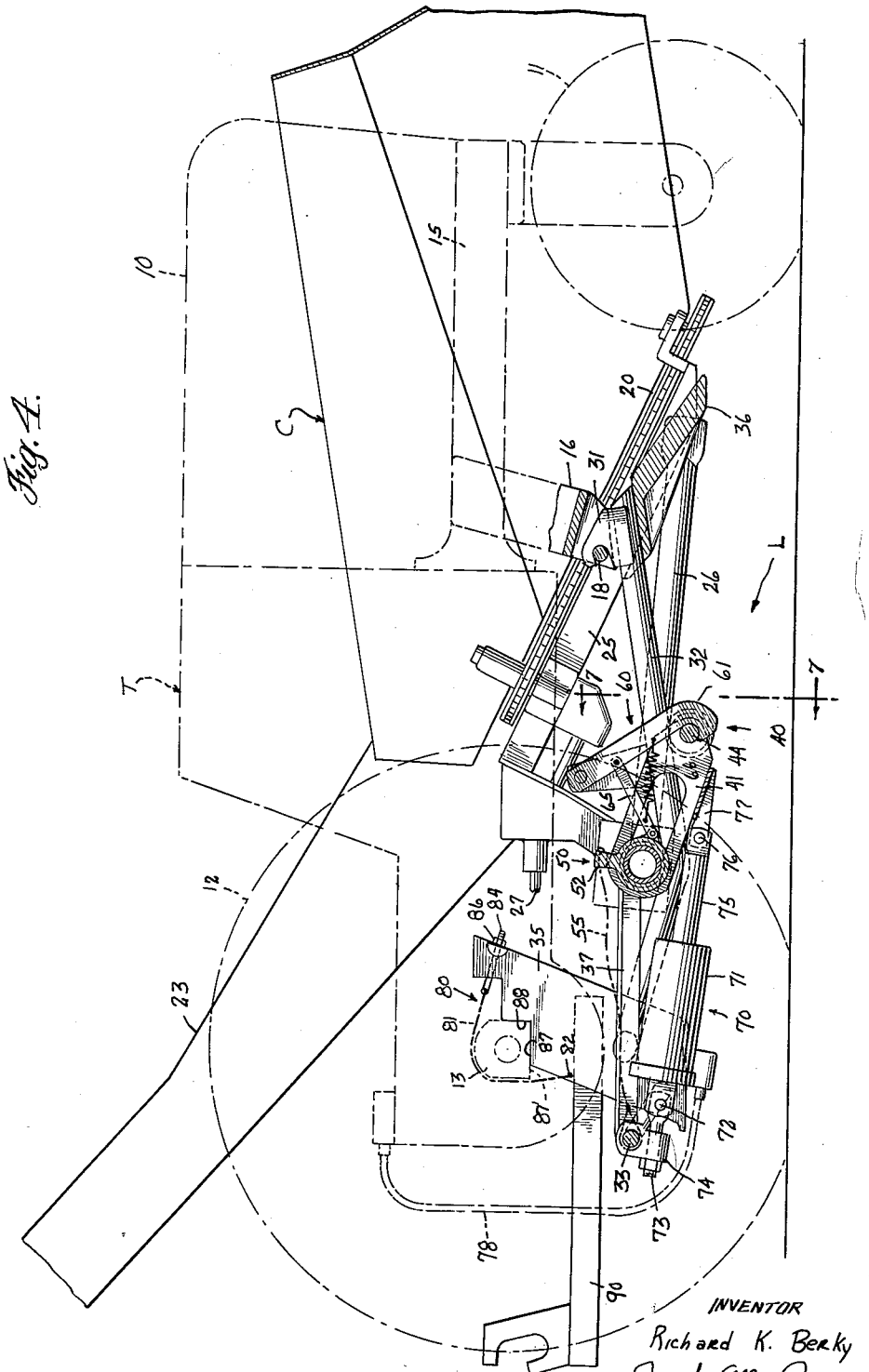

April 25, 1961 R. K. BERKY 2,981,343
IMPLEMENT MOUNTING DEVICE
Filed May 31, 1956 5 Sheets-Sheet 5
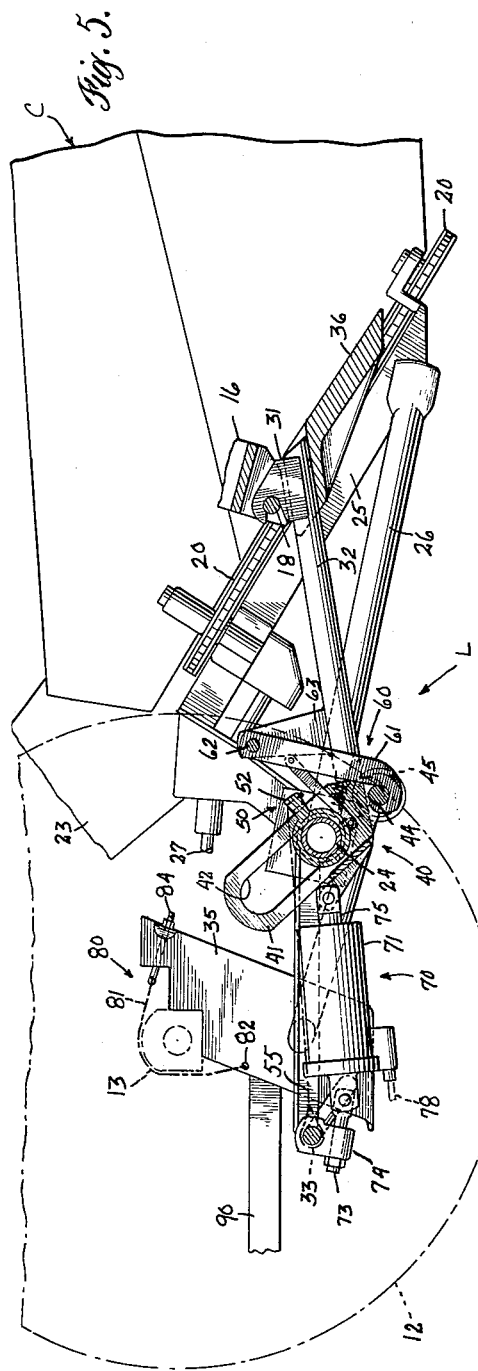
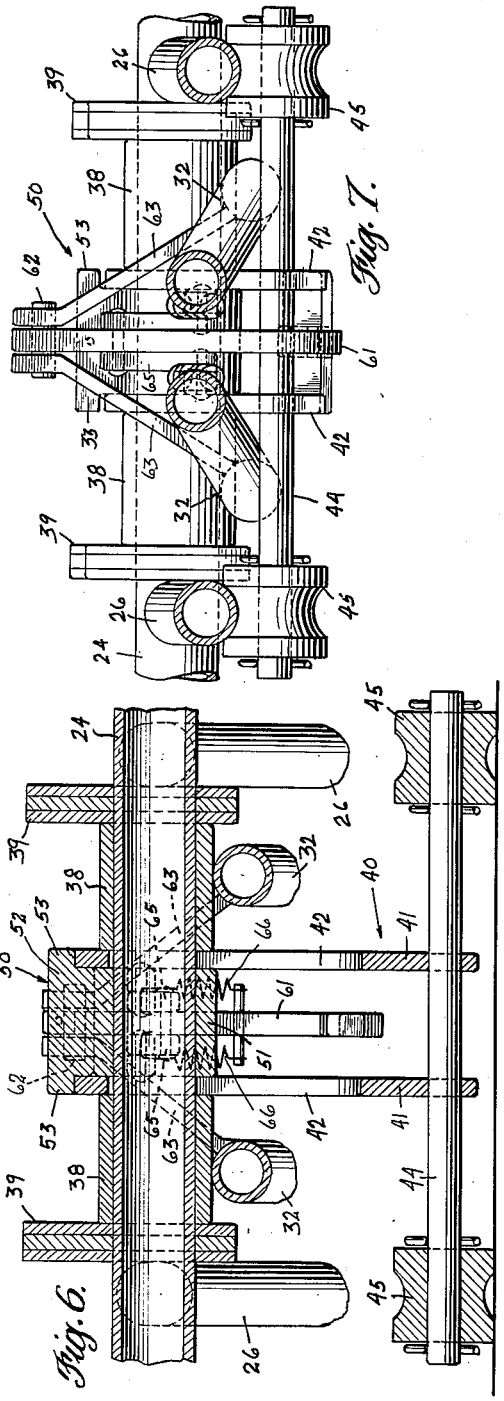
INVENTOR
Richard K. Berky
Joseph Allen Brown
ATTORNEY

United States Patent Office 2,981,343
Patented Apr. 25, 1961

2,981,343
IMPLEMENT MOUNTING DEVICE
Richard K. Berky, Lancaster, Pa., assignor to Sperry Rand Corporation, New Holland, Pa., a corporation of Delaware Filed May 31, 1956, Ser. No. 588,390
14 Claims. (Cl. 172—274)

The present invention relates generally to agricultural implements and more particularly to corn pickers. Still more specifically, the invention relates to a device for mounting a two-row corn picker on a tractor.

With current two-row tractor mountable corn pickers presently on the market, it usually takes two men up to half a day to mount or dismount a picker from a tractor; and, much heavy lifting is required. Since the soy bean harvest coincides with the corn harvest in most corn raising areas of the United States and since corn can be harvested more efficiently in the morning and soy beans during the drier afternoon hours, tying up a large tractor with a mounted picker is a distinct handicap in a farmer's operations.

One important object of this invention is to provide a device for mounting a two-row corn picker on a tractor, said device being operable to accomplish such mounting in a matter of minutes.

Another object of this invention is to provide a lifting device of the character described with which an operator may mount a corn picker on a tractor without the assistance of another person.

Another object of this invention is to provide means whereby a corn picker can be mounted on a tractor without any heavy lifting being required.

A further object of this invention is to provide a mounting device of the character described having means whereby a corn picker, once it is mounted on the tractor, may be adjusted so that the amount of clearance between the front of the corn picker and the ground may be regulated.

A still further object of this invention is to provide a lifting device having means whereby a tractor mounted corn picker may be adjusted to an infinitely variable number of positions.

A still further object of this invention is to provide a lifting device of the character described which is relatively inexpensive to manufacture and which, therefore, can be sold at relatively low cost.

Other objects of this invention will be apparent hereinafter from the specification and from the recital in the appended claims.

In the drawings:

Fig. 3 is a view similar to Fig. 2, but showing the lifting device in its second stage of operation, in what may be termed a "jacking-up" position;

Fig. 4 is a view similar to Figs. 2 and 3, taken on the lines 4—4 of Fig. 1 and illustrating the lifting device in its third stage of operation or final hitching position;

Fig. 5 is a fragmentary side elevational sectional view illustrating the device in position for effecting adjustment of the front end of the corn picker relative to the ground;

Fig. 6 is an enlarged section taken on the lines 6—6 of Fig. 3 and looking in the direction of the arrows; and, Fig. 7 is an enlarged section taken on the line 7—7 of Fig. 4 looking in the direction of the arrows.

Figure 1:
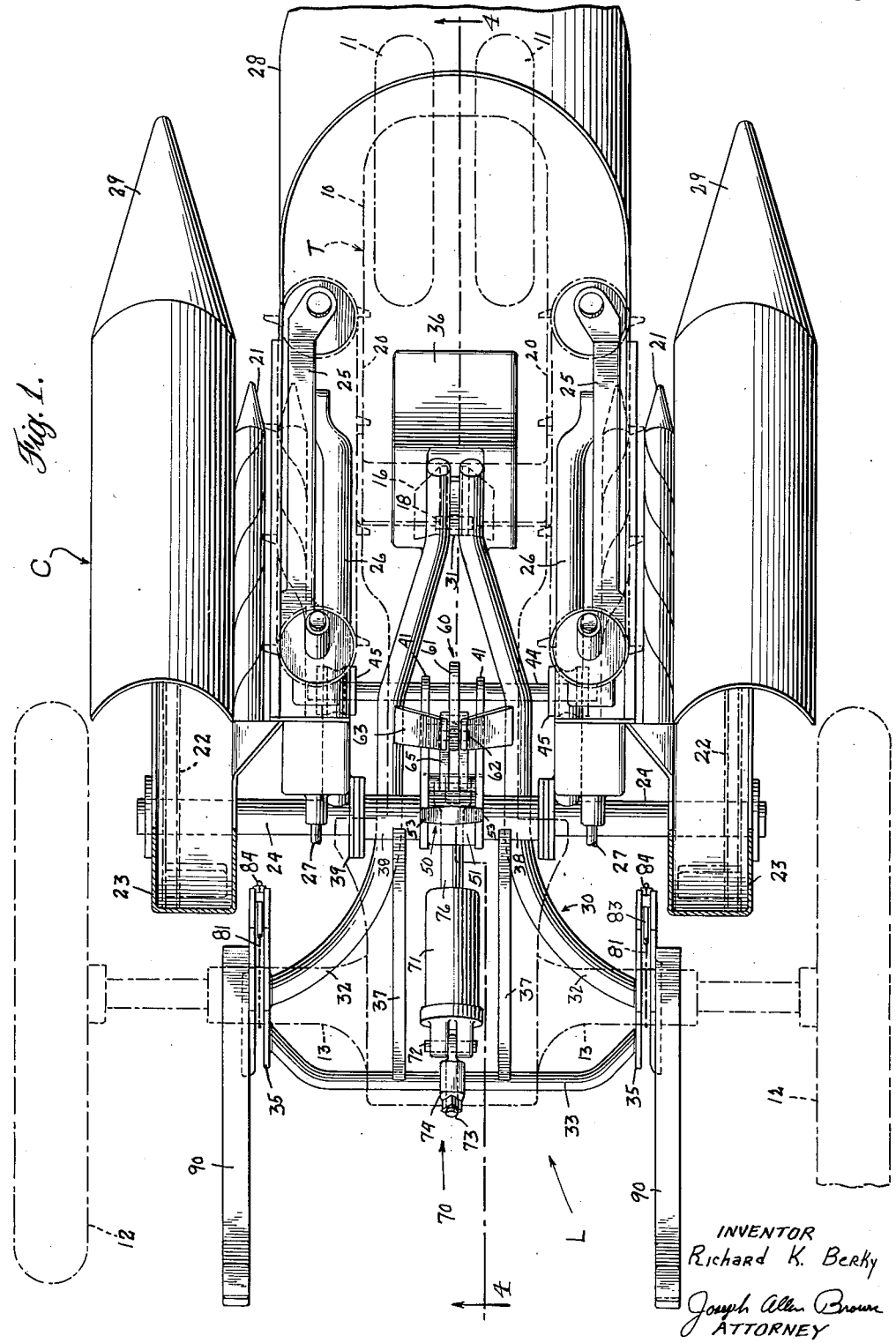
Fig. 1 is a fragmentary plan view showing, in dotted lines, a tractor having mounted thereon a two-row corn picker which is illustrated more or less diagrammatically, and which includes a lifting device constructed according to one embodiment of this invention.

Referring now to the drawings by numerals of reference, and particularly to Figs. 1–4, T denotes a tractor, C a corn picker, and L a lifting device constructed according to this invention for removably mounting the corn picker on the tractor.

Tractor T is of a well known type comprising a body 10 supported at its forward end by a pair of dirigible wheels 11—11 and at its rear end by a pair of traction wheels 12—12. The tractor has an axle housing 13 through which power is transmitted to the traction wheels. Body 10 has a frame member 15 which extends rearwardly beneath the front end of the tractor; and, depending from this frame member is a bracket 16 which carries a fixed quick attach pin 18. Pin 18 is utilized in a manner hereinafter described.

Corn picker C is of the two-row type, having conventional picking unit at each side of the tractor body. Each unit includes a gathering chain 20, a snapping unit 21, an elevator chain 22 (Figs. 1 and 2), and an elevator housing 23. The picker units are supported by a frame structure which includes a transverse cross-bar or member 24, connected at its ends to housings 23 of the respective elevator chains, frame members 25—25 which carry the respective gathering chains 20, and parallel tubular frame members 26 which extend forwardly from cross bar 24. The picker units are provided with drive shafts 27 adapted to be universally connected in a usual manner to the power unit of the tractor for driving the pickers.

Corn picker C is further provided with a central hood or deflector 28 which over-lies and extends forwardly of dirigible wheels 11, and a pair of side deflectors 29, one for each picking unit and operable in a well known manner to guide corn stalks into the picker units.

Lifting device L comprises, in general, a main frame 30 having a quick attach hook 31 at its forward end, a jack frame 40, a latch 50, a pivoted hook 60, a hydraulically operated device 70, and axle connecting means 80.

Figure 2:
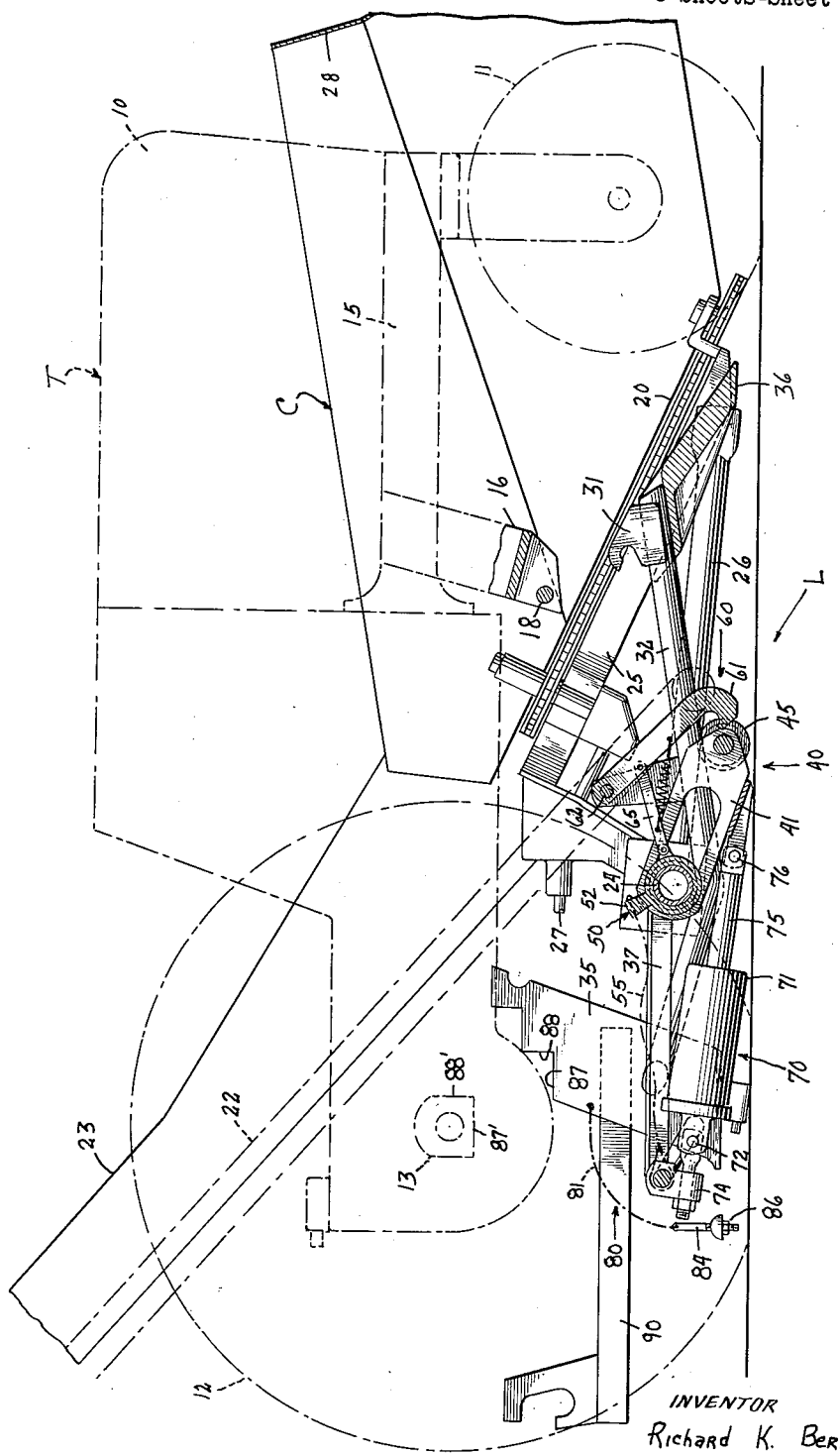
Fig. 2 is a sectional elevation taken substantially through the center of the tractor and the corn picker and illustrating the lifting device of the corn picker in its first stage of operation, that is, in collapsed position, the tractor being shown in dotted lines and various portions of the corn picker being omitted for purposes of clarity.

Main frame 30 comprises a pair of spaced parallel longitudinal tubular members 32 and a rear cross member 33 arranged substantially in the form of an A in plan view, as shown in Fig. 1. Members 32 extend horizontally and are connected at their rear ends to vertical web plates 35—35, respectively, as by welding or other suitable means. Cross member 33 is likewise connected to these web plates, as shown. The members 32 project forwardly and beneath cross bar 24 of the corn picker frame, being somewhat in the form of a V when viewed from the side. (Figs. 2 and 3.)

Members 32 are connected by their forward ends to a ramp 36 which extends forwardly and downwardly from the members. Interposed between the forward ends of members 32 and welded thereto is the quick attach hook 31 which projects upwardly and which has its entry or opening facing rearwardly (Figs. 2 and 3).

A pair of spaced parallel tracks 37 (Fig. 1) extend longitudinally between rear frame member 33 and crossbar 24, being welded at their rear ends to member 33 and at their forward ends to sleeves 38 carried on the cross bar and in which the cross bar is freely rotatable. Spacer members 39 are provided on cross bar 24 between the sleeves 38 and frame members 26. Members 39 prevent outward movement of the sleeves 38.

Tracks 37 are spaced apart a distance approximately equal to the spacing between the medial parallel portions of members 32 to thereby provide a substantially continuous track from rear frame member 33 to the forward end of ramp 36 (Fig. 1), said spacing being generally the same as the spacing of dirigible wheels 11 on the tractor.

The jack frame 40 comprises a pair of spaced parallel frame members 41—41 having elongate slots 42 through which cross bar 24 extends. Members 41—41 are both pivotal and slideable on the cross bar and are connected by a transverse rod 44 (Figs. 6 and 7) adjacent their free ends. Rod 44 extends laterally from members 41 and carries grooved rollers 45 adjacent its ends. These rollers lie underneath frame members 26 on the corn picker frame and are operable thereagainst as hereinafter described.

Latch 50 is operatively associated with the jack frame 40. It comprises a sleeve 51 (Fig. 6), mounted on cross bar 24 between members 41—41. The sleeve has a radial portion 52 formed with a pair of outboard lugs or ears 53 which extend, respectively, parallel to the axis of cross bar 24 and overlie one of the members 41. A lanyard 55 is connected to portion 52 of sleeve 51 and extends rearwardly therefrom to rear cross member 33 to which it is suitably attached. Lanyard 55 is provided so that the radial extension of portion 52 of the sleeve can be adjusted.

Hook 60 is likewise operatively associated with the jack frame 40, and comprises a hook member 61 pivotal on a pin 62 supported by a pair of upwardly projecting brackets 63 welded to main frame members 32 (Figs. 1 and 6). Latch 50 and hook 60 are connected by a pair of link arms 65, each of which is pivotally connected at one end to sleeve 51 and at its opposite end to hook member 61. A pair of tension springs 66 connect the medial portions of the link arms to hook member 61.

The brackets 63 are so located with respect to jack frame 40 that the hooked end of member 61 will engage and be disengaged from transverse rod 44 during operation of the lift device.

Device 70 comprises a cylinder 71 pivotally connected at 72 to an arm 73 adjustable in a bracket 74 fixedly connected to cross member 33. Operable in cylinder 71 is a piston, not shown, having a piston rod 75 projecting out of the cylinder and pivotally connected at 76 to a cross brace 77 secured to members 41—41 of jack frame 40. The piston in cylinder 71 is hydraulically actuated in a conventional manner, deriving its hydraulic power from the tractor and being connectable thereto by means of flexible fluid lines 78 diagrammatically illustrated in Figs. 3 and 4. Any suitable control means of conventional form may be employed in operating device 70.

Axle connecting means 80 comprises a pair of chains 81, one carried by each vertical web plate 35. Each chain 81 has an end 82 permanently secured to its associated web plate, and a free end 83 which carries a threaded member 84. Chains 81 are adapted to be passed over axle housing 13 and then connected to the upper ends of the web plates, as by nuts 86.

It will be noted from Figures 2–5 that the upper ends of web plates 35 are of step-like configuration. Horizontal portions 87 and vertical portions 88 of the web plates 35 form a seat for the bottom and front faces of axle housing 13, and denoted 87' and 88', respectively.

Each web plate carries a rearwardly extending hitch member 90 so that husking means may be towed behind or carried on the corn picker and tractor.

*Operation*

Assuming that corn picker C is resting on the ground and that lift device L is in collapsed position (Fig. 2) the picker is mounted on tractor T in the following manner:

The operator driving the tractor T approaches the corn picker from the rear, steering the tractor so that the front dirigible wheels 11 come into alignment with tracks 37. The tractor is driven over device L, so that the body 10 passes between the spaced picker units and with dirigible wheels 11 rolling over tracks 37, then over the parallel portions of main frame members 32, thence to ramp 36 and down the ramp to the ground. The tractor is stopped with quick attach pin 18 slightly to the rear of quick attach hook 31, as shown in Fig. 2.

Next the flexible fluid lines 78 are connected from the tractor hydraulic system to device 70. When connected, the operator checks latch 50 to be sure that its lugs 53 over-lie the curved, arcuate, rearward ends of members 41 of jack frame 40. Now the hydraulic system is actuated to retract piston rod 75. This causes the lifting device to shift from the position shown in Fig. 2 to that shown in Fig. 3. The jack frame 40 is caused to swing arcuately downwardly, or in a clockwise direction from the position shown in Fig. 2. As the rollers 45 engage the ground, device L is elevated.

It will be noted, particularly from Fig. 3, that cross bar 24 would slide downwardly in elongate slots 42 in jack frame members 41 but for the engagement of lugs 53 against the ends of members 41. Therefore, it is the latch 50 which controls or permits the elevation of device L on retraction of piston rod 75.

At the front end of device L, quick attach hook 31 is brought into engagement with bracket 16 depending from the tractor frame member 15; and, it is placed in semi-engagement with pin 18. At the rear end of the device, web plates 35 are lifted into engagement with axle housing 13, the horizontal portions 87 of the web plates engaging the bottom faces 87' of the axle housing.

Corn picker C is now off the ground except for the forward ends of the picker units which cooperate with the jack frame 40 to balance the elevated picker. When in this position, the operator passes chains 81 over axle housing 13 and connects the free ends of the chains to the upper ends of the web plates (Fig. 3). The operator then drives the tractor forwardly a slight amount to engage socket pin 18 in quick attach hook 31 and to firmly seat axle housing 13 against the web plates 35. Nuts 86 may then be easily tightened with the fingers to secure the corn picker on the tractor.

With the front end of the corn picker connected to the tractor body by hook 31 and its rear end connected to the tractor axle housing by chains 81, the operator actuates the tractor hydraulic mechanism to force fluid against the piston in cylinder 71 to force piston rod 75 outwardly of the cylinder. As piston 76 moves outwardly, jack frame 40 pivots upwardly about cross bar 24. The rollers 45 on transverse rod 44 leave the ground and come into engagement with frame members 26 of the corn picker, and as the jack frame with its rollers are elevated, the front end of the corn picker is elevated to the position shown in Fig. 4.

When piston rod 75 reaches the end of its outward stroke, hook 61, under the action of link arms 65 and springs 66, hooks over transverse rod 44 to hold jack frame 40 in raised position.

With jack frame 40 elevated and hooked, the operator unlatches latch 50 using a lanyard 55; sleeve 51 is pivoted on cross bar 24 to move the lugs 53 from the ends of members 41 (Fig. 5). The operator may now adjust the front end of the corn picker relative to the ground. This is accomplished by retracting piston rod 75, as shown in Fig. 5. Since members 41 are now free to slide relative to cross bar 24, retraction of rod 75 causes the members to slide and the front end of corn picker C to move downwardly. To raise the front end, piston rod 75 is moved outwardly again. Adjustment of the front end of the corn picker is limited only by the length of slots 42.

The adjustment of the front end of corn picker C is infinitely variable between a high position, as shown in Fig. 4, and a low position as shown in Fig. 5. Thus, the operator is able to set the picker at just the right position for optimum picking under existing conditions.

It will be noted from the above that in mounting corn picker C on the tractor T, no lifting whatsoever is required of the operator. Lifting device L deriving its power from the hydraulic mechanism on the tractor does practically all of the work.

While the mounting operation has been described in some detail, it will be apparent that it may be quickly performed. In sequence, the tractor is driven over device L; the hydraulic means is then connected up; device L is then elevated and is chained to axle housing 13; then the jack frame 40 is raised and latch 50 unlatched, whereupon the operator adjusts the picker relative to the ground.

When it is desired to dismount the corn picker, tractor T is driven to a desired unloading station. Then the operator actuates the hydraulic device 70 to fully extend piston rod 75, with the various parts assuming the positions shown in Fig. 4. Latch 50 is moved to latched position by pulling lanyard 55, that is, by moving lugs 53 behind the arcuate rear ends of members 41. As latch 50 pivots on cross bar 24, hook 61 is unhooked, being swung about its pivot 62 by link arms 65. Latch 50 is momentarily held in this position (Fig. 4) while the hydraulic device is actuated to retract piston rod 75. As piston rod 75 retracts, jack frame 40 swings downwardly and its rollers 45 engage the ground. At the same time, the front end of corn picker C is dropped to the ground.

With the corn picker supported by jack frame 40, chains 81 are removed from around axle housing 13. Now piston rod 75 is forced outwardly again and the lifting device collapses (Fig. 2). The hydraulic lines are now disconnected and tractor T is backed up to free it from the picker. Wheels 11 roll up ramp 36, over the parallel portions of frame 32, over tracks 37 and then to the ground.

Mounting or dismounting the corn picker takes only a matter of minutes; and, it requires only one person to perform the operation above described. The device L saves most of the time heretofore required for mounting a corn picker on a tractor. Therefore, the tractor T is tied up for a minimum of time; and, after a corn picking operation has been completed, the tractor may be immediately used for other purposes.

While this invention has been described in connection with a particular emobdiment thereof, it will be apparent that it is capable of further modification, and this application is intended to cover any variations, uses, or adaptations following, in general, the principles of the invention and incuding such departures from the present disclosure as come within known or customary practice in the art to which the invention pertains, and as fall within the scope of the invention or the limits of the appended claims.

Having thus described my invention, what I claim is:

1. A device for mounting an implement on a tractor wherein said tractor has a rear axle and a fixed member disposed forwardly and spaced from said rear axle, and said implement has a frame including a cross-bar which extends parallel to said rear axle and about the axis of which the implement is pivotal, said device comprising a jack frame extending radially of said cross-bar and pivotal thereon, said jack frame when pivoted in one direction being engageable with the ground for elevating said implement to a desired height relative to the tractor, means at the forward and rear ends of said device connectable to said fixed member and said rear axle, respectively, when said implement is elevated to said desired height, said jack frame when pivoted in a direction opposite to said one direction, after said connecting means has been connected to the tractor, being engageable with said frame to pivot said implement about said cross-bar.

2. A device for mounting an implement on a tractor wherein said tractor has a rear axle and a fixed member disposed forwardly and spaced from said rear axle, and said implement has a frame including a cross-bar which extends parallel to said rear axle and about the axis of which the implement is pivotal, said device comprising a jack frame extending radially of said cross-bar and pivotal thereon, said jack frame having an elongate slot through which said cross-bar extends, a latch engaging said cross-bar and said jack frame, said latch in one position preventing movement of said jack frame relative to said cross-bar in the direction of elongation of said slot, said jack frame when pivoted in one direction when said latch is in said one position being engageable with the ground for elevating said implement to a desired height relative to the tractor, means at the forward and rear ends of said device connectable to said fixed member and said rear axle, respectively, when said implement is elevated to said desired height, said jack frame being retractable by pivoting it in a direction opposite to said one direction after said connecting means has been connected to the tractor, said jack frame on retraction being engageable with said implement frame to pivot the implement about said cross-bar, means for holding said jack frame in retracted position, said latch being movable to another position when said jack frame is retracted and held to permit movement of the jack frame relative to said cross-bar.

3. A device for mounting an implement on a tractor wherein said tractor has a rear axle and a fixed member disposed forwardly and spaced from said rear axle, and said implement has a frame including a cross-bar which extends parallel to said rear axle and about the axis of which the implement is pivotal, said device comprising a jack frame extending radially of said cross-bar and pivotal thereon, said jack frame having an elongate slot through which said cross-bar extends, a latch engaging said cross-bar and said jack frame, said latch in one position preventing movement of said cross-bar in said slot, said jack frame when pivoted in one direction when said latch is in said one position being engageable with the ground for elevating said implement to a desired height relative to the tractor, means at the forward and rear ends of said device connectable to said fixed member and said rear axle, respectively, when said implement is elevated to said desired height, said jack frame being retractable by pivoting it in a direction opposite to said one direction after said connecting means has been connected to the tractor, said jack frame on retraction being engageable with said implement frame to pivot the implement about said cross-bar, means for holding said jack frame in retracted position, said latch being moveable to another position when said jack frame is retracted and held to permit movement of the jack frame relative to said cross-bar in the direction of elongation of said slot, and hydraulically actuated means for actuating said jack frame.

4. A hydraulically actuated device for mounting and adjusting an implement on a tractor wherein said tractor has a rear axle and a fixed pin disposed forwardly and spaced from said rear axle and extending parallel thereto, and said implement has a frame including a cross-bar extending parallel to said axle and about the axis of which the implement is pivotal, said device being carried by said implement and having a frame including spaced parallel longitudinal tracks attached to said cross-bar and extending rearwardly therefrom, said tractor having front wheels adapted to be driven over said device with said front wheels passing over said tracks to position the tractor properly with respect to said implement, said device being operable when the tractor is in proper position and comprising a jack frame extending radially forwardly of said cross-bar and being pivotal thereon, said jack frame having an elongate slot through which said cross-bar extends, a latch, said latch when in latched position preventing movement of the jack frame relative to said cross-bar in the direction of elongation of said slot, said jack frame when pivoted in one direction when said latch is latched being engageable with the ground for elevating said implement to a desired height relative to the tractor, a hook at the forward end of said implement frame, a pair of chains at the rear end of said implement frame, said hook being connectable to said fixed pin and said chains being adapted to be wrapped around said rear axle, respectively, to connect the implement to the tractor when the implement has been elevated to said desired height, said jack frame being retractable by pivoting it in a direction opposite to said one direction after the implement is conncected to the tractor, said jack frame on retraction being engageable with said implement frame to pivot the implement about said cross-bar, means for holding said jack frame in retracted position, said latch being moveable to another position when said jack frame is retracted and held to permit movement of said cross-bar in said slot.

5. A device for mounting an implement on a tractor comprising means carried by said implement for elevating and adjusting said implement, a two-position control member mounted on said elevating and adjusting means and having means to cause a ground engageable member to pivot about an axis transverse to the longitudinal axis of the tractor when the control member is in one position and reciprocate relative to said axis when the control member is in a second position, said elevating and adjusting means including a member engageable with the ground to lift said implement to a desired height relative to the tractor when said control member is in its one position, means for connecting said implement to said tractor when the implement is elevated to said desired height, said elevating and adjusting means also including pivot means for pivoting said implement about said axis when in elevated position, and means mounting said ground engageable member for retraction from ground engagement following the connecting of said connecting means and movement into engagement with said implement when said control member is in its second position to pivotally adjust said implement about said transverse axis upon reciprocation of said ground engageable member.

6. A device as claimed in claim 5 wherein said elevating and adjusting means is hydraulically actuated.

7. A device as claimed in claim 5 wherein said tractor has a rear axle and a fixed member disposed forwardly of said rear axle and spaced therefrom, and said connecting means comprises a hook engageable with said fixed member and flexible means adapted to be wrapped around said rear axle.

8. A device for mounting an implement on a tractor wherein said tractor has a rear axle and a fixed member disposed forwardly and spaced from said rear axle and said implement has a frame including a member which extends parallel to said rear axle and about the axis of which the implement is pivotal, said device comprising means carried by said implement and engageable with the ground for elevating said implement to a desired height relative to said tractor, forward and rear connecting means for connecting said device to said fixed member and said rear axle, respectively, when said implement is elevated to said desired height, and means for retracting said elevating means from the ground and moving it into engagement with said implement frame following the connecting of said connecting means to pivot the frame about said parallel member.

9. A device for mounting an implement on a tractor wherein said tractor has a rear axle and a fixed member disposed forwardly and spaced from said rear axle, and said implement has a frame including a member which extends parallel to said rear axle and about the axis of which the implement is pivotal, said device comprising means carried by said implement and engageable with the ground for elevating said implement to a desired height relative to said tractor, forward and rear connecting means carried by said device and connectable to said fixed member and said rear axle, respectively, when said implement is elevated to said desired height, and hydraulic means for retracting said elevating means from the ground and moving it into engagement with said implement frame following the connecting of said connecting means to pivot the frame about said parallel member.

10. A device for mounting an implement on a tractor wherein said tractor has a rear axle and a fixed member disposed forwardly and spaced from said rear axle, and said implement has a frame including a member which extends parallel to said rear axle and about the axis of which the implement is pivotal, said device comprising hydraulically actuated means carried by said implement and engageable with the ground for elevating said implement to a desired height relative to said tractor, forward and rear connecting means carried by said device and connectable to said fixed member and said axle, respectively, when said implement is elevated to said desired height, said rear connecting means comprising flexible members adapted to be wrapped around said rear axle, and hydraulic means for retracting said elevating means from the ground and moving it into engagement with said implement frame following the connecting of said connecting means to pivot the frame about said parallel member.

11. A device as claimed in claim 10 wherein said flexible members comprise a pair of chains each of which has one end affixed to said implement frame and an end opposite said one end adapted to be passed over said rear axle of the tractor and then affixed to the implement frame.

12. A device for mounting an implement on a tractor wherein the implement is pivotal about a generally horizontal axis transverse to the direction of travel of the tractor when mounted on said tractor and wherein said device has a rear end connectable to a rear member on the tractor and a forward end connectable to a forward member on the tractor, said rear and forward device ends being spaced below said rear and forward tractor members when the implement is unmounted, comprising combined means carried by said implement for elevating said rear and forward device ends for connection to said rear member and said forward member, respectively, and for pivoting said implement about said transverse axis after said ends are connected to said members.

13. A device for mounting an implement on a tractor wherein the tractor has a rear axle and a fixed member disposed forwardly of the axle and spaced therefrom, said device being carried on said implement and comprising means engageable with the ground for elevating the implement to a desired height relative to said tractor, forward and rear connecting means for connecting said device to said fixed member and said axle, respectively, when the implement is elevated to said desired height, said elevating means being retractable following the connecting of said connecting means, said implement being pivotal on an axis parallel to the axis of said rear axle when mounted on said tractor, the pivoting of said implement being controllable through operation of said elevating means.

14. A device for mounting an implement on a tractor comprising means including a member engageable with the ground and movable relative thereto when in such engagement for elevating the implement to a desired height relative to the tractor, said member being carried by said implement, connecting means carried by said implement, said connecting means being adapted, when said implement has been elevated to a desired height only, to connect the implement to the tractor, said same elevating means being operable when the implement is connected to the tractor to adjust one end of the implement relative to the ground.

References Cited in the file of this patent

UNITED STATES PATENTS

| | | |
|---|---|---|
| 2,347,871 | Andrews et al. | May 2, 1944 |
| 2,376,541 | Johnson et al. | May 22, 1945 |
| 2,491,354 | Acton | Dec. 13, 1949 |
| 2,500,040 | McKahin | Mar. 7, 1950 |
| 2,736,152 | Andrews et al. | Feb. 28, 1956 |
| 2,738,083 | Cadwell | Mar. 13, 1956 |
| 2,748,960 | Stueland | June 5, 1956 |